No. 613,324. J. SELCER. Patented Nov. 1, 1898.
SKEIN THREAD HOLDER.
(Application filed Oct. 2, 1896. Renewed May 13, 1898.)
(No Model.)
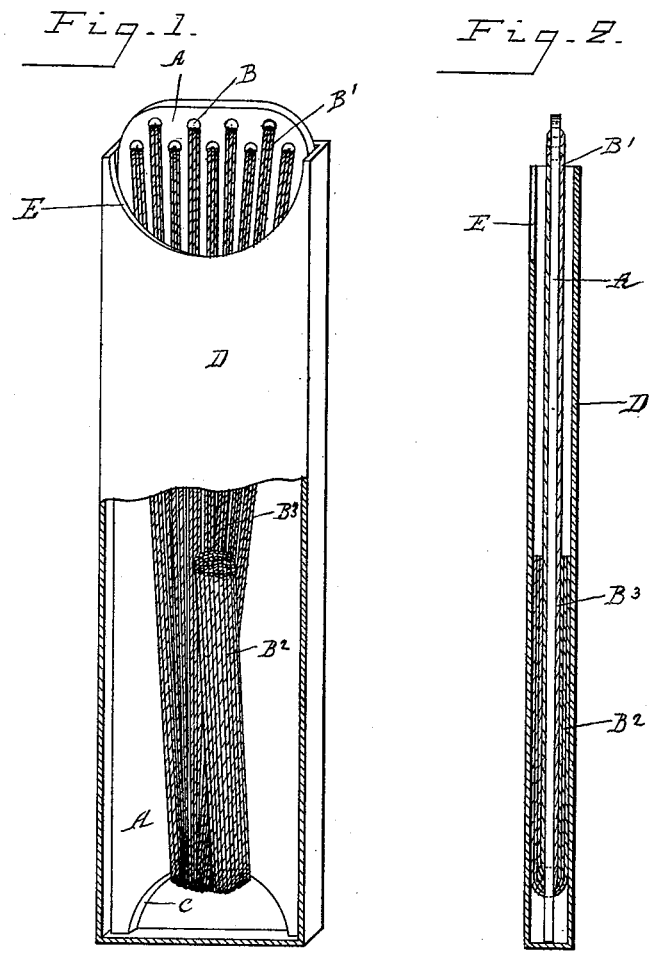
WITNESSES:
John B. McGuire
Geo. G. Stebbins
INVENTOR
John Selcer
BY C. J. Lundstrom
ATTORNEY

United States Patent Office.

JOHN SELCER, OF LITTLE FALLS, NEW YORK.

SKEIN-THREAD HOLDER.

SPECIFICATION forming part of Letters Patent No. 613,324, dated November 1, 1898.

Application filed October 2, 1896. Renewed May 13, 1898. Serial No. 680,639. (No model.)

*To all whom it may concern:*

Be it known that I, JOHN SELCER, a citizen of the United States, residing at Little Falls, in the county of Herkimer, State of New York, have invented a new and useful Skein-Thread Holder, of which the following is a specification.

This invention relates to improvements in skein-thread holders; and the object of my improvement is to provide a simple and cheap skein-thread holder which may be easily recharged when emptied and when so charged will permit the different-colored skein-threads to be easily withdrawn one by one and without any danger of having the threads become entangled. I attain this object by the construction illustrated in the accompanying drawings, in which—

Figure 1 is a fragmentary perspective view of the invention. Fig. 2 is a sectional view of the device, parts being shown in elevation.

Similar letters refer to corresponding parts throughout both views.

A represents a board provided at its upper end with a series of holes B, adapted to receive the skein-threads B' and keep the different-colored ones separate. The lower portion of this board is provided with a concavity C, which prevents the skein-threads from sliding off to the sides of the board when they are folded up, as hereinafter described.

D represents a rectangular casing or envelop into which the board when charged with threads is inserted. The front side of this casing has a concavity E cut out in its upper portion. This concavity exposes the entire set of the skein-threads contained on the board and affords a convenient opening through which all the threads may be reached and separately withdrawn.

In order to enable the operator to obtain a grip on the board when the same is to be withdrawn from the casing, the board should be made longer than the casing and project for some distance through the opening of the same.

In charging or filling the holder with skein-threads the board is first pulled out of the casing, and then the skeins, having been previously cut to uniform lengths, are pulled through the holes of the board in such way that an equal length of each thread is suspended on both sides of the board. The end portions B² of the threads are then folded over through the concavity C to the opposite sides of the board and caused to overlap the main portions B³ of the threads and to run in opposite direction to that of the said main portions. With that position of the threads the board is inserted in the rectangular casing, the broad sides of the same engaging the end portions of the threads, and thus clamps the same firmly between the main portion of the threads and the said sides of the casing.

It will be readily seen that the friction established between the ends of the threads and the inner sides of the casing when the board is inserted in the same tends to tighten the threads, and in so doing greatly eliminates the danger of getting the threads entangled when afterward withdrawn.

I do not desire to limit myself to the particular construction herein shown and described, as various changes may be made in the construction of the board-blank as well as that of the casing without departing from the spirit and scope of my invention. For instance, the board may be made of same length or even shorter than the casing and provided with a handle or other means for facilitating the operation of withdrawing the same from the casing. The casing may also be made oval in cross-section instead of rectangular.

Having thus described my invention, what I claim as new, and desire to secure by Letters Patent, is—

In a skein-thread holder, a mounting-board having two rows of holes made through its upper end, and which holes are set staggering in relation to each other, the lower end of the board being concave, combined with an inclosing case or box of less length than the board, and which box is open at its upper end, and provided at one side with a concavity that is opposite to or adjacent to the upper end of the board; each separate skein being passed through one of the holes, and having its ends turned up from opposite sides of the lower end of the board inside of the inclosing case or box, substantially as shown and described.

Witness my hand this 30th day of September, 1896.

JOHN SELCER.

Witnesses:
M. G. BRONNER,
T. M. BURNES.